July 21, 1959
J. A. BROOKS ET AL  2,895,898
TEMPERATURE CONTROL IN PLATINUM CATALYST REFORMING
Filed May 28, 1956
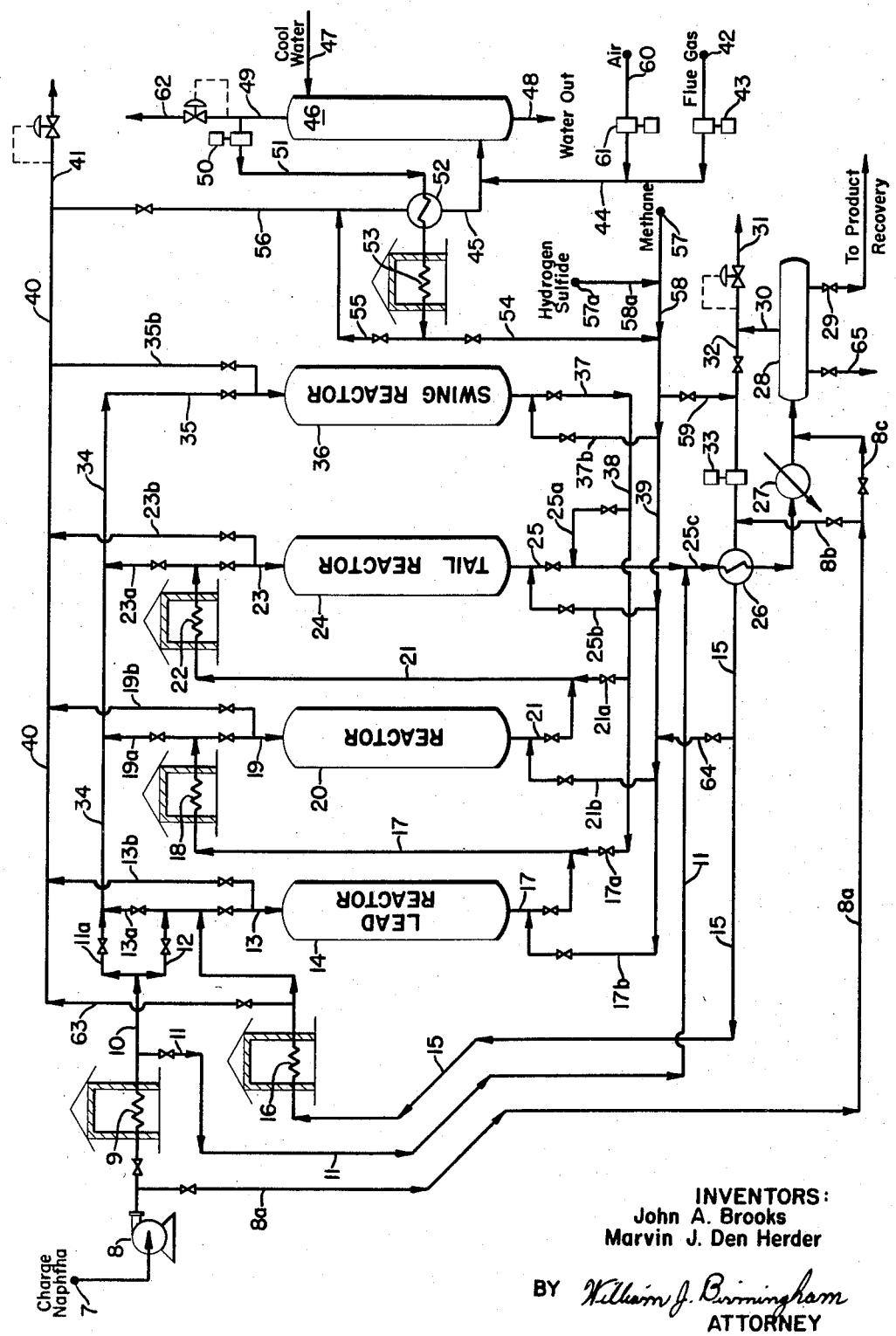
INVENTORS:
John A. Brooks
Marvin J. Den Herder
BY *William J. Birmingham*
ATTORNEY United States Patent Office 2,895,898
Patented July 21, 1959

2,895,898

TEMPERATURE CONTROL IN PLATINUM CATALYST REFORMING

John A. Brooks and Marvin J. Den Herder, Chicago, Ill., assignors to Standard Oil Company, Chicago, Ill., a corporation of Indiana Application May 28, 1956, Serial No. 587,778

12 Claims. (Cl. 208—65)

This invention relates to a method of operating a platinum catalyst naphtha reforming system, and it pertains more particularly to a method for avoiding the formation of heat-fronts in the catalyst bed of a reactor which is being brought on-stream at reforming temperatures.

Platinum catalyst hydroforming systems present problems very different from those encountered in molybdenum systems. One particularly difficult problem has been the unexpected formation of heat-fronts or hot-spots which pass through a catalyst bed when new or freshly-regenerated platinum catalyst initially comes in contact with both hydrogen and hydrocarbons at reforming temperatures, i.e. 850° F. to 1000° F. This situation arises, for instance, when returning a bed of regenerated platinum catalyst to on-stream operation in a multiple fixed-bed system, as exemplified by Ultraforming (Petroleum Engineer, vol. XXVI, No. 4, April 1954, at page C-35), wherein catalyst is fully reactivated in an isolated reactor while reforming continues in the remaining reactors. In such a system hydrogen-rich recycle gas and naphtha are already at reforming temperature when coming into contact with the regenerated catalyst. Two distinct heat-fronts may result. The first heat-front is formed when the hydrogen-rich recycle gas, which normally contains some hydrocarbons, initially contacts the catalyst. The second heat-front appears when the naphtha is subsequently introduced into the reactor. These heat-fronts cause coke formation on the catalyst with consequent catalyst deactivation. In extreme cases, heat-fronts may also cause deactivation by changing the crystalline structure of the catalyst, particularly in the case of platinum-alumina catalysts containing halogen. An object of this invention is to avoid the formation of heat-fronts when hydrogen-rich recycle gas comes in contact with new or regenerated platinum catalyst at reforming temperatures. Another object is to avoid the formation of heat-fronts when naphtha comes in contact with new or regenerated platinum catalyst in the presence of hydrogen at reforming temperatures. Another object is to avoid deactivation of new or fully reactivated platinum catalysts in a reactor which is being returned to reforming operation in a multiple fixed-bed reactor system wherein naphtha is being simultaneously reformed in other reactors. Still another object of this invention is to permit the return to on-stream operation of a reactor containing regenerated-rejuvenated platinum catalyst without having to cool the catalyst bed or lower the temperature of the hydrogen-rich recycle gas and naphtha introduced therein below conventional reforming temperatures. These and other objects will be apparent as the detailed description of the invention proceeds.

To avoid heat-fronts when bringing a reactor containing a highly-active platinum catalyst on-stream at reforming temperature, we introduce a special catalyst treating step between the flue gas purge, which removes any oxygen-containing gases from the reactor, and the introduction into the reactor of hydrogen-rich recycle gas and naphtha. In brief, this treating step consists of contacting the catalyst with a sulfur-containing non-reactive gas.

To bring a reactor on-stream in accordance with our invention we first purge oxygen-containing gases therefrom with flue gas at about atmospheric pressure, that is 5–10 p.s.i.g., and at a temperature of 800–1200° F., preferably, about 850–1000° F. This flue gas purge may also be commenced at higher pressures and the reactor then depressured during the purge. After this purge, we contact the catalyst with a non-reactive gas containing about 0.05 to 5 mol. percent, preferably 0.2 to 2 mol percent, of sulfur in a free or combined form, preferably hydrogen sulfide, at 1100° F. or less, preferably reforming temperature, e.g. about 850–1000° F., for from about 0.1 to 2 hours, preferably about 0.2 to 1 hour, at about atmospheric pressure, e.g. 5–10 p.s.i.g., although higher pressures may also be used. The sulfur concentrations indicated are average concentrations for the treating period. Generally, higher sulfur concentrations are preferred for the shorter contact times. It should be understood, however, that the sulfur concentration in the non-reactive gas may be varied during the treating period. For instance, a very high concentration of sulfur may be used initially and none used during the latter part of the treatment. Likewise, no sulfur may be used initially and a high concentration may be used during the latter part of the treatment.

The non-reactive gas may be nitrogen, normally gaseous hydrocarbons, such as methane, ethane, propane, light hydrocarbon gas mixtures of the type commonly referred to as LPG and natural gas, and mixtures thereof. Sulfur may be added in uncombined or combined form, such as hydrogen-sulfide, hydrocarbon sulfides, mercaptans, and mixtures thereof. The sulfur-containing non-reactive gas must be substantially free of uncombined hydrogen. The treatment is preferably once-through to remove simultaneously any contaminants, e.g. carbon dioxide, carbon monoxide, water, etc., which may be present in the reactor or lines or desorbed from the catalyst. Treating gas is preferably passed over the catalysts at linear velocities equivalent to on-stream linear velocities, e.g. .1 to 10 feet per second.

Following the above treatment, recycle gas is introduced into the reactor at about atmospheric pressure, e.g. 5–10 pounds p.s.i.g. for from about 1 minute to 2 hours, preferably about 5–10 minutes. This recycle gas may be circulated one-through to purge the treating gas and to carry away any additional contaminants. Temperature of this recycle gas may be 1000° F. or less, preferably reforming temperature, e.g. 850–1000° F. The reactor is then pressured up to reforming pressure, e.g. 100–700 p.s.i.g., with recycle gas. On reaching reforming pressure naphtha vapors are then introduced. With the regenerated reactor on-stream, another reactor may be removed, if desired, for regeneration.

Without the special treating step as above described heat-fronts may be formed and, when formed, usually pass through the catalyst bed at the rate of between 0.05 and 0.5 inch per second in the direction of recycle gas and naphtha flow. They may raise the catalyst temperature as much as several hundred degrees Fahrenheit. The particular extent of coke formation resulting from heat-fronts depends on many variables, including the severity of the hot-spot, recycle gas rate, composition of the recycle gas, type of naphtha, initial activity of the catalyst, etc. For instance, in one series of tests with a platinum-alumina catalyst containing 0.6 weight percent platinum with a Mid-Continent naphtha at a recycle gas rate of 4000 cubic feet per barrel, naphtha heat-fronts deposited coke on the catalyst to the extent of 0.02 weight percent coke for each 10° F. of temperature rise.

The exact mechanism in which our invention solves the problem of recycle gas and naphtha heat-fronts is not fully understood. It has been observed that heat-fronts are usually encountered only during the first few minutes that recycle gas and/or naphtha are introduced at reforming temperatures. They are also usually encountered only with new platinum catalyst or used platinum catalyst which are in a highly active state. Thus with a slightly deactivated catalyst, the heat-front may be encountered after a simple carbon burnoff. With a substantially deactivated platinum catalyst the heat-front may be encountered only after substantial reactivation by such a technique as the regeneration-rejuvenation technique used in Ultraforming. Heat front formation may be particularly pronounced if the platinum catalyst has been contacted with a halogen or halogen-affording compound. In the normal start-up of platinum catalyst reformers heat-fronts are usually not considered a problem because the platinum catalyst is normally contacted with hydrogen and hydrocarbons at a temperature substantially below reforming temperature, e.g. below 850° F.

Whatever the cause, sulfur inhibits heat-front formation. Since sulfur can also decrease platinum catalyst activity, however, excessive amounts should be avoided. When used in proper concentrations, no deleterious effect on activity occurs. The sulfur must contact the catalyst before hydrogen and hydrocarbon simultaneously contact the catalyst at reforming temperature. Hydrogen sulfide in hydrogen-rich recycle gas itself does not prevent the formation of the recycle gas heat-fronts. The non-reactive gas may thus be considered as a carrier for the sulfur. It also prevents contact of recycle-gas hydrogen with carbon dioxide from flue gas, which, together, would result in the formation of carbon, carbon monoxide, and water, known contaminants of platinum catalysts. The non-reactive gas also serves as a medium for carrying off any contaminants which may be desorbed from the catalyst.

The invention will be more clearly understood by references to the following example read in conjunction with the accompanying drawing which is a schematic flow diagram of an Ultraforming system in which our procedure for bringing a reactor on-stream is particularly advantageous.

In normal operation of a Ultraforming system a naphtha charge such, for example, as the 150 to 360° F. fraction of Mid-Continent virgin naphtha, which may or may not be hydrodesulfurized, is introduced from source 7 by pump 8 through preheater 9 and transfer line 10 from which the preheated charge may be by-passed by line 11 to the product recovery system during start-up procedure. In on-stream operation transfer line 10 will discharge through lines 12 and 13 to reactor 14 along with hydrogen-rich recycle gas from line 15 which is preheated in heater 16. Effluent from reactor 14 passes through line 17, reheater 18 and transfer line 19 to reactor 20. Effluent from reactor 20 passes through line 21, reheater 22 and transfer line 23 to tail reactor 24. It should be understood that more than three reheater-reactor stages may be employed in the system.

Effluent from the tail reactor flows through lines 25 and 25c, heat exchanger 26 and cooler 27 to separator 28 from which hydroformed product is withdrawn through line 29 to a stabilizer and/or conventional product recovery system. A part of the hydrogen-rich gas withdrawn from the separator through line 30 may be vented through line 31, but usually about 1,000 to 10,000 cubic feet per barrel of charge is recycled through line 32 by means of circulating compressor 33 to line 15.

Transfer lines 11a, 13a, 19a and 23a may be selectively connected to header 34 for discharging through line 35 to swing reactor 36, the effluent from which passes through line 37 to header 38 and thence through line 17a to line 17, line 21a to line 21, or line 25a to line 25. During normal on-stream operation without the swing reactor the valves in lines 11, 11a, 13a, 13b, 17a, 17b, 19a, 19b, 21a 21b, 23a, 23b, 25a, and 25b remain closed and the valves in lines 12, 13, 17, 19, 21, 23 and 25 remain open.

The swing reactor may be substituted for the lead reactor by opening valves in lines 13a, 35, 37 and 17a and closing valves in lines 13 and 17. Alternatively, it may be substituted for intermediate reactor 20 by opening valves in lines 19a, 35, 37 and 21a and closing the valves in lines 19 and 21. The swing reactor may take the place of the tail reactor by opening valves in lines 23a, 35, 37 and 25a and closing valves in lines 23 and 25. It will thus be seen that each of the reactors may be taken off-stream for regeneration and replaced by the swing reactor and that, alternatively, the swing reactor may be connected to operate in parallel with any of the other on-stream reactors during periods when no regeneration is required.

In some Ultraforming systems the hydrogen-rich recycle gas and the naphtha charge are heated in the same preheater. In such systems the charge introduced by pump 8 may be introduced by lines 8a and 8b to line 15 just ahead of heat exchanger 26 during normal operation and may be introduced by line 8a and line 8c to the line entering separator 28 during start-up.

Each of the reactors is provided with a refractory lining of low iron content, and metal surfaces may preferably be aluminized. They may each contain about the same amount of catalyst although, if desired, the subsequent reactors may contain somewhat more catalyst than the initial reactors. The catalyst may be of any known type of supported platinum catalyst, and the platinum is preferably supported on alumina; it may be prepared by compositing a platinum chloride with an alumina support as described, for example, in U.S. Patent 2,659,701, and it preferably contains about .3 to .6 weight percent of platinum.

The on-stream pressure is usually below about 400 p.s.i.g., i.e. in the range of 200 to 350 p.s.i.g. The inlet temperatures to each reactor are usually in the range of about 850 to 1000° F., e.g. about 920° F., and may be approximately the same for each reactor although it is sometimes desirable to employ somewhat lower inlet temperature to the initial reactor than to the remaining reactors. The overall weight space velocity may be in the range of about 1 to 4 pounds of naphtha per pound of catalyst per hour. There is, of course, a pressure drop in the system so that the lead reactor may operate at about 50 to 100 p.s.i. higher pressure than the tail reactor.

Prior to regeneration hot hydrogen-rich gas for stripping hydrocarbons from catalyst in a blocked-out reactor may be introduced by line 63 to manifold line 40 and thence through one of lines 13b, 19b, 23b, or 35b to the selected reactor. Also, hydrogen-rich gas may be introduced from line 15 to manifold line 39 by line 64.

For effecting purging and regeneration of the catalyst in any bed, purge gases and regeneration gases may be introduced through manifold line 39 and a selected one of lines 17b, 21b, 25b and 37b. Such purge and regeneration gases may be selectively withdrawn through lines 13b, 19b, 23b and 35b to manifold line 40 from which gases may be vented or flared through line 41. Flue gas from source 42 may be introduced to the system by compressor 43 and passed by lines 44 and 45 through a drying chamber 46 which is preferably a scrubbing tower into which cool water is introduced through line 47 and from which water is withdrawn through line 48. The scrubbed flue gas withdrawn from the top of the tower through line 49 is passed by compressor 50 through line 51, heat exchanger 52, heater 53 and line 54 to manifold line 39 when it is desired to introduce flue gas into the system for purging and/or regeneration. By closing the valve in line 54 and opening the valve in line 55, the flue gas may be recirculated through line 56, heat exchanger 52 and line 45 back to the scrubber. Air may be introduced from source 60 by compressor 61 for effecting regeneration and/or regeneration-rejuvenation of the catalyst. During regeneration excess flue gas may be vented from the system by line 62.

Methane, conveniently in the form of natural gas, may be introduced from source 57 and line 58 to manifold line 39. Hydrogen-sulfide may be introduced from source 57a and line 58a to line 58 where it may be carried to manifold 39 by methane from source 57. Methane, hydrogen-sulfide-containing methane, or flue gas from manifold line 39 may be introduced to the inlet of circulating compressor 33 by line 59.

One unique characteristic of the Ultraforming process, in contrast with non-regenerative platinum reforming processes, is the fact that an Ultraformer can be started up without use of extraneous hydrogen. Such a startup procedure is described in co-pending application S.N. 502,604, filed April 20, 1955.

The method of effecting catalyst regeneration will be described as applied to the swing reactor but it will be understood that the same procedure may be employed for any one of the other reactors when it is blocked out. When the charge inlet valve in line 35 is closed and while the valve in line 37 remains open, hot hydrogen-rich gas is introduced by line 63 to manifold line 40 and thence through line 35b to strip out any hydrocarbons that may remain in the reactor, this stripped material being discharged through lines 37, 38, 25a, and 25c. Next, the valves in lines 63 and 67 are closed and reactor 36 is depressured by opening the valve in line 41. Next, the reactor is purged to eliminate hydrogen-rich gas therefrom either by introducing flue gas from line 54 via lines 39 and 37b, the purge gases being vented through lines 35b, 40 and 41. After the flue gas purge, the valve in line 41 is closed and introduction of flue gas from source 42 is continued to pressure the reactor with flue gas to approximately the same pressure as that employed in on-stream processes, i.e. about 300 p.s.i.g. The temperature of the catalyst bed is adjusted to about 650 to 750° F. preparatory to initiating regeneration by circulating flue gas, under such pressure, through the reactor by compressor 50. Heat may be supplied to the circulating gas by heater 53, if necessary. Next, controlled amounts of air are introduced from source 60 by compressor 61 into the circulating flue gas stream at a rate to effect combustion of carbonaceous deposits without exceeding a combustion zone temperature of about 1050° F. The hot flue gas leaving the reactor at about this temperature passes by lines 35b, 40 and 56 through heat exchanger 52 and thence through line 45 to scrubber 46 wherein the gas is scrubbed with cool water for condensing and eliminating most of the water formed by combustion of hydrocarbonaceous deposits. The net amount of flue gas production is vented from the system through line 62, the valve in which is set to maintain the desired back pressure of about 300 p.s.i.g. The cooled flue gas which is recirculated by compressor 50 may be further dried by passing through a desiccant bed (not shown) before it is returned through heat exchanger 52 to heater 53 which, during regeneration, maintains a transfer line temperature of approximately 700° F.

The transfer line temperature of heater 53 is increased to about 950° F. in order to reheat the catalyst bed to that temperature. If rejuvenation is required the introduction of flue gas is stopped and the introduction of air is continued so that the catalyst is treated with a circulating air stream at a pressure of about 100 to 350 p.s.i.g. and a temperature of about 950° F. to 1100° F. for a period of about one-half hour to twelve hours or more depending upon the extent of rejuvenation required. For rejuvenation sufficient air must be added so that the partial pressure of the oxygen is at least 0.4 atmosphere.

After the regeneration (or after rejuvenation if rejuvenation has been effected) the introduction of air is stopped, and flue gas is introduced from source 42 to purge all oxygen from the swing reactor and from the regeneration system. During the flue gas purge the system is depressured by slowly opening the valve in line 41. After removal of all oxygen the valves in lines 54 and 56 are closed and the introduction of flue gas is stopped. In accordance with our invention, the reactor and lines are then purged with methane, i.e. natural gas, containing about 0.05 to 5 mol. percent of hydrogen sulfide, preferably about 0.2 to 2.0 mol. percent, e.g. 0.5 mol. percent, for from about 0.1 to 2 hours, preferably from about 0.2 to 1.0 hour, e.g. 0.5 hour, at about atmospheric pressure, e.g. 5 to 10 p.s.i.g. The hydrogen sulfide-containing methane is introduced to reactor 36, via lines 37b and 39, from line 58, wherein hydrogen sulfide from source 57a and line 58a is mixed with methane from source 57, and leaves reactor 36 through lines 35b, and 40, and is flared or vented through valved line 41. Temperature of the treating gas may range from ordinary temperature to 1100° F. preferably reforming temperatures, e.g. about 850–1000° F. This once-through treatment brings the catalyst in contact with sulfur before hydrogen together with hydrocarbons are introduced, and thereby avoids formation of heat-fronts. The treatment also removes other contaminants in the reactor and lines and contaminants desorbed from the catalyst, e.g. carbon dioxide, carbon monoxide, water, etc.

After treatment of the catalyst, the introduction of treating gas is stopped, and the treating gas is purged from the system with hydrogen-rich recycle gas from line 15 which is introduced through lines 64, 39, and 37b by opening the valve in line 64. Because of the prior treatment of the catalyst, no damaging heat-fronts result from introduction of the hydrogen-rich recycle gas. Next, the valves in lines 37b, 64 and 41 are closed, and reactor 36 is pressured with hot hydrogen-rich recycle gas introduced through lines 63, 40, 35b by opening the valve in line 63. When the reactor is thus brought to desired operating pressure, the valves in lines 63 and 35b are closed and the reactor may be placed on-stream by opening valves in lines 35 and 37. Again, because of the prior treatment of the catalyst, no damaging heat-front is encountered when naphtha initially comes in contact with the catalyst in the presence of hydrogen at reforming temperatures.

The following experiments illustrate the highly advantageous effect of bringing a reactor on-stream in the manner disclosed herein as contrasted with conventional procedures, which do not include the special treatment with a sulfur-containing non-reactive gas.

*Examples*

A series of treating tests were made in a pilot plant reaction system using a freshly-regenerated platinum-alumina reforming catalyst, which contained about .6 wt. percent platinum and about .5 wt. percent chloride. To simulate one reactor of an Ultraforming unit the catalyst was loaded in one bed. Bed temperature, except for the heat-fronts, was 900° F. during all tests and temperature control was isothermal. Naphthas were of Mid-Continent orgin. Heat-front temperatures presented herein are integrated average peak temperatures above the bed temperature as measured by a series of five thermocouples distributed equi-distant in the catalyst bed. In each case, however, maximum temperature rise resulting from the heat-front was considerably greater than the integrated average.

When the catalyst bed was contacted with recycle gas followed by naphtha, without prior treatment as herein disclosed, a recycle gas heat-front in excess of 200° F. above the bed temperature and a naphtha heat-front in excess of 150° F. above the bed temperature were observed. When 1% hydrogen sulfide was added to the recycle gas prior to contact with the catalyst, the naphtha heat-front was eliminated, but the recycle gas heat-front was still in excess of 200° F. During these and subsequent reforming tests the naphtha was introduced at a pressure of 300 p.s.i.g., at a weight hourly space velocity of 1.5, and with a recycle gas rate of 4000 cubic feet per barrel.

In the next series of experiments, which demonstrate our invention, the catalyst was subjected to treatment with methane containing 1 mol. percent hydrogen sulfide at 900° F. and atmospheric pressure for about 0.5 hour at the same flow rate as recycle gas is circulated during on-stream operation, e.g. 4000 S.C.F per barrel of naphtha charge. In each case, the naphtha heat-front was eliminated entirely and the recycle gas heat-front was reduced to less than about 20° F. These data indicate the substantially complete effectiveness of the treating step herein disclosed.

Because it was believed that higher treating pressures might reduce the heat-front sufficiently so that hydrogen sulfide could be eliminated from the treating gas, another experiment was undertaken in which the catalyst was treated with methane (without hydrogen sulfide) at 900° F. and one atmosphere, and then pressure was raised to 100 p.s.i.g. before recycle gas was introduced. In this case the recycle gas hot-spot was about 50° F. and the naphtha heat-front was about 150° F. This experiment clearly indicated that methane alone was not sufficient for curing the heat-fronts, and also that raising pressure did not cope with the problem. It again pointed up the unique effectiveness of the treating step herein disclosed in controlling heat-front formation in platinum catalyst hydroforming systems.

While our invention has been described herein as applied to bringing the swing reactor of an Ultraforming unit on-stream while other reactors in the system are already on-stream, it should be understood that it is equally applicable to each of the other reactors when bringing said reactors on-stream. Our invention has also been described as applied to a freshly-regenerated-rejuvenated catalyst. It should be understood, of course, that it is also applicable to new platinum catalysts which are contacted simultaneously with hydrogen and hydrocarbons at reforming temperatures. While our invention has been described as applied to a particular Ultraforming system, various alternative arrangements and operating conditions will be apparent in the above description to those skilled in the art.

Having thus described the invention, we claim:

1. In a platinum catalyst naphtha reforming system including lead, intermediate, and tail reaction zones containing said platinum catalyst, heating zones, and a gas separation zone, in which a hydrogen-rich gas is separated for recycling, the method of bringing said platinum catalyst on-stream at reforming temperatures which comprises purging said catalyst with flue gas to remove oxygen therefrom; purging said catalyst for about 0.1 to 2 hours with a non-reactive gas containing 0.05 to 5 mol. percent sulfur, said gas being substantially free of uncombined hydrogen, to effect removal of flue gas from said catalyst and to contact said catalyst with sulfur; thereafter purging said catalyst with the hydrogen-rich separated gas; and contacting said catalyst with naphtha vapors; whereby heat fronts during initial contact of said catalyst with hydrogen-rich separated gas and with naphtha vapors are inhibited.

2. The method of claim 1 in which said non-reactive gas is a normally-gaseous hydrocarbon containing about 0.05 to 5 mol. percent of sulfur.

3. The method of claim 1 in which said non-reactive gas is nitrogen containing about 0.05 to 5 mol percent of sulfur.

4. The method of claim 1 in which said non-reactive gas is natural gas containing about 0.05 to 5 mol. percent hydrogen sulufide.

5. The method of claim 1 in which said non-reactive gas is displaced from said catalyst by purging with said hydrogen-rich separated gas.

6. In a regenerative platinum-catalyst naphtha-reforming system containing a plurality of reaction zones containing beds of platinum catalyst, in which system a bed of platinum catalyst in at least one of said reaction zones is substantially reactivated off-steam in the presence of oxygen-containing gases while naphtha is being reformed in the remaining of said reaction zones in the presence of hydrogen-rich recycle gas, the method of returning an off-stream bed of platinum catalyst after regeneration to reforming operation at reforming temperatures without incurring deleterious hot spots in said bed which method comprises purging said off-stream bed of platinum catalyst with flue gas to remove oxygen therefrom; purging said off-stream bed of platinum catalyst for about 0.1 to 2 hours with a non-reactive gas containing 0.05 to 5 mol. percent sulfur, said non-reactive gas being substantially free of uncombined hydrogen, whereby flue gas is displaced and said off-stream bed of platinum catalyst is contacted with sulfur; introducing said hydrogen-rich recycle gas into said off-stream bed of platinum catalyst at reforming temperatures; and introducing naphtha vapors therein at reforming temperatures.

7. The method of claim 6 in which said non-reactive gas is a normally-gaseous hydrocarbon containing about 0.05 to 5 mol. percent sulfur.

8. The method of claim 6 in which said non-reactive gas is nitrogen containing about 0.05 to 5 mol. percent sulfur.

9. The method of claim 6 in which said non-reactive gas is methane containing about 0.05 to 5 mol. percent hydrogen sulfide.

10. In a regenerative platinum catalyst naphtha reforming system containing a plurality of reaction zones in which beds of platinum catalyst in any of said reaction zones may be regenerated-rejuvenated off-stream in the presence of oxygen-containing gases while naphtha is being reformed in the remaining of said reaction zones in the presence of hydrogen-rich recycle gas, the method of preparing an off-stream bed of platinum catalyst after regeneration for on-stream operation at reforming temperatures without incurring deleterious heat fronts in the catalyst bed, which method comprises purging said off-stream bed of platinum catalyst with flue gas to remove oxygen therefrom; contacting said off-stream bed of platinum catalyst and purging said flue therefrom with natural gas containing about 0.05 to 5 mol. percent hydrogen sulfide at atmospheric pressure and reforming temperatures for about 0.1 to 2 hours; purging the hydrogen sulfide-containing natural gas from said off-stream bed of platinum catalyst with said hydrogen-rich recycle gas at reforming temperatures; pressuring said off-stream bed of platinum catalyst to on-stream pressure with said hydrogen-rich recycle gas; and contacting said off-stream bed of platinum catalyst with naphtha vapors at reforming temperatures.

11. In the method of returning a bed of regenerated platinum catalyst to on-stream operation at reforming temperatures in a multiple-reaction-zone system in which hydrogen-rich gas is recycled, which method comprises purging said bed of regenerated platinum catalyst with flue gas to remove oxygen therefrom and then purging said bed of regenerated catalyst with hydrogen-rich recycle gas prior to contacting said bed of regenerated platinum catalyst with naphtha vapors, the improvement which comprises contacting said bed of regenerated platinum catalyst after the flue gas purge but prior to the hydrogen-rich recycle gas purge with a hydrogen-free non-reactive gas containing about 0.05 to 5 mol. percent sulfur for about 0.1 to 2 hours.

12. The method of claim 11 wherein the hydrogen-free non-reactive gas is passed over the catalyst at linear velocities of about 0.1 to 10 feet per second.

References Cited in the file of this patent

UNITED STATES PATENTS

| | | |
|---|---|---|
| 2,228,724 | Leum et al. | Jan. 14, 1941 |
| 2,232,909 | Gohr | Feb. 25, 1941 |
| 2,288,336 | Welty et al. | June 30, 1942 |
| 2,604,438 | Bannerot | July 22, 1952 |
| 2,642,381 | Dickinson | June 16, 1953 |
| 2,643,214 | Hartwig | June 23, 1953 |
| 2,731,335 | Odell | Jan. 17, 1956 |
| 2,749,287 | Kirshenbaum | June 5, 1956 |

UNITED STATES PATENT OFFICE

CERTIFICATE OF CORRECTION

Patent No. 2,895,898                                July 21, 1959

John A. Brooks et al.

It is hereby certified that error appears in the printed specification of the above numbered patent requiring correction and that the said Letters Patent should read as corrected below.

Column 2, line 47, for "one-through" read -- once-through --; column 3, line 44, for "of a" read -- of an --; column 8, line 7, for "off-steam" read -- off-stream --; line 47, after "flue" insert -- gas --.

Signed and sealed this 17th day of May 1960.

(SEAL)
Attest:

KARL H. AXLINE                                                ROBERT C. WATSON
Attesting Officer                                           Commissioner of Patents